(12) United States Patent
Galan Ventosa et al.

(10) Patent No.: US 10,844,867 B2
(45) Date of Patent: Nov. 24, 2020

(54) EXHAUST GAS TURBOCHARGER FOR AN INTERNAL COMBUSTION ENGINE, PARTICULARLY OF A MOTOR VEHICLE

(71) Applicant: Daimler AG, Stuttgart (DE)

(72) Inventors: Alfonso Galan Ventosa, Fellbach (DE); Harald Ruedle, Stuttgart (DE); Markus Mueller, Waiblingen (DE); Elias Chebli, Aidlingen (DE)

(73) Assignee: Daimler AG, Stuttgart (DE)

( * ) Notice: Subject to any disclaimer, the term of this patent is extended or adjusted under 35 U.S.C. 154(b) by 0 days.

(21) Appl. No.: 15/568,418

(22) PCT Filed: Apr. 6, 2016

(86) PCT No.: PCT/EP2016/000564
§ 371 (c)(1),
(2) Date: Oct. 20, 2017

(87) PCT Pub. No.: WO2016/169636
PCT Pub. Date: Oct. 27, 2016

(65) Prior Publication Data
US 2018/0149166 A1 May 31, 2018

(30) Foreign Application Priority Data
Apr. 21, 2015 (DE) .................... 10 2015 005 034

(51) Int. Cl.
*F01D 25/24* (2006.01)
*F04D 29/056* (2006.01)
(Continued)

(52) U.S. Cl.
CPC ....... *F04D 29/0563* (2013.01); *F01D 25/162* (2013.01); *F01D 25/24* (2013.01);
(Continued)

(58) Field of Classification Search
CPC .. F05D 2220/40; F05D 2240/20; F01D 25/24; F01D 25/16; F04D 29/284
See application file for complete search history.

(56) References Cited

U.S. PATENT DOCUMENTS

| 9,181,955 B1 * | 11/2015 | House ................ F01D 25/164 |
| 2006/0177319 A1 * | 8/2006 | Liebl ................ F01D 25/183 |
| | | 417/407 |

(Continued)

FOREIGN PATENT DOCUMENTS

| DE | 10 2011 075 517 A1 | 12/2011 |
| DE | 11 2011 103 096 T5 | 7/2013 |

(Continued)

OTHER PUBLICATIONS

Japanese Office Action issued in Japanese counterpart application No. 2017-555251 dated Feb. 26, 2019, with partial English translation (Nine (9) pages).

(Continued)

*Primary Examiner* — Long T Tran
(74) *Attorney, Agent, or Firm* — Crowell & Moring LLP

(57) ABSTRACT

An exhaust gas turbocharger for an internal combustion engine, particularly of a motor vehicle, is disclosed. The exhaust gas turbocharger includes a bearing housing having at least one through hole for a rotor of the exhaust gas turbocharger for supporting the rotor. At least one housing cover is connected to the bearing housing such that the through hole is sealed at least partially in the axial direction of the exhaust gas turbocharger. The housing cover is connected to the bearing housing by exactly one threaded element having an external thread, which threaded element is screwed to the bearing housing by its external thread and a corresponding internal thread of the bearing housing.

6 Claims, 2 Drawing Sheets

(51) Int. Cl.
  *F04D 25/02* (2006.01)
  *F02C 6/12* (2006.01)
  *F04D 29/62* (2006.01)
  *F01D 25/16* (2006.01)

(52) U.S. Cl.
  CPC .............. *F02C 6/12* (2013.01); *F04D 25/024* (2013.01); *F04D 29/624* (2013.01); *F05D 2220/40* (2013.01); *F05D 2260/30* (2013.01)

(56) References Cited

U.S. PATENT DOCUMENTS

| | | | |
|---|---|---|---|
| 2007/0122296 A1* | 5/2007 | Arnold | F04D 25/04 417/407 |
| 2011/0103948 A1 | 5/2011 | Kuzi et al. | |
| 2011/0232324 A1* | 9/2011 | Kurihara | F04D 29/266 62/498 |
| 2011/0243762 A1* | 10/2011 | Daikoku | F16C 37/002 417/321 |
| 2012/0227398 A1* | 9/2012 | Uhlig | F01D 25/243 60/605.1 |
| 2013/0223772 A1 | 8/2013 | Holzschuh et al. | |
| 2013/0294948 A1 | 11/2013 | Schumnig | |
| 2016/0377089 A1* | 12/2016 | Boening | F04D 29/266 415/216.1 |
| 2018/0238383 A1 | 8/2018 | Nambu et al. | |

FOREIGN PATENT DOCUMENTS

| | | |
|---|---|---|
| JP | 63-9428 U | 1/1988 |
| JP | 2011-220264 A | 11/2011 |
| WO | WO 2016/129039 A1 | 8/2016 |

OTHER PUBLICATIONS

PCT/EP2016/000564, International Search Report dated Jun. 8, 2016 (Two (2) pages).

* cited by examiner

EXHAUST GAS TURBOCHARGER FOR AN INTERNAL COMBUSTION ENGINE, PARTICULARLY OF A MOTOR VEHICLE

BACKGROUND AND SUMMARY OF THE INVENTION

The invention relates to an exhaust gas turbocharger for an internal combustion engine, particularly of a motor vehicle such as, for example, a passenger car.

Such an exhaust gas turbocharger for an internal combustion engine, particularly of a motor vehicle, is already known from DE 11 2011 103 096 T5, for example. The exhaust gas turbocharger comprises a bearing housing for supporting a rotor. Such a rotor usually has a shaft and at least one impeller such as a turbine wheel and/or a compressor wheel, for example, with the shaft being connected in a torque-proof manner to the impeller. When the exhaust gas turbocharger is in the fully manufactured state, the rotor is usually supported via the shaft on the bearing housing and can be rotated relative to the bearing housing about an axis of rotation.

The turbine wheel can be driven by exhaust gas of the internal combustion engine. Since the turbine wheel and the compressor wheel are non-rotatably connected to the shaft, the compressor wheel can be driven by the turbine wheel via the shaft. The compressor wheel is used to compress air so that energy contained in the exhaust gas can be utilized to compress the air. The bearing housing has at least one through hole for the rotor. In other words, in the fully manufactured state of the exhaust gas turbocharger, the rotor penetrates through the through hole of the bearing housing.

The exhaust gas turbocharger further comprises at least one housing cover that is connected to the bearing housing by means of which the through hole is covered at least partially in the axial direction of the exhaust gas turbocharger and is thus sealed. The axial direction of the exhaust gas turbocharger coincides with the axial direction of the rotor and extends in the direction of the axis of rotation of the rotor. In DE 11 2011 103 096 T5, the through hole and the housing cover are arranged on sides of the compressor wheel, that is, on the compressor side.

It was found that the mounting of the housing cover is intricate, since the danger exists of the housing cover tilting and becoming wedged and/or mounted with an only asymmetrical force, particularly pressing force, on the bearing housing. The precise mounting of the housing cover without tilting and becoming wedged is important, however, in order to prevent excessive leakage, for example of lubricating oil, as well as excessive blow-by of the exhaust gas turbocharger.

It is therefore the object of the present invention to further develop an exhaust gas turbocharger of the type mentioned at the outset such that the housing cover can be mounted in an especially simple manner, thereby making it possible to prevent excessive leakage and excessive blow-by.

In order to further develop an exhaust gas turbocharger such that the especially simple and precise mounting of the housing cover can be achieved, with it being possible for excessive leakage and excessive blow-by of the exhaust gas turbocharger to be prevented, a provision is made according to the invention that the housing cover is connected to the bearing housing by means of exactly one threaded element having an external thread, which threaded element is screwed to the bearing housing by means of its external thread and a corresponding internal thread of the bearing housing. It is the background of the invention that housing covers in conventional exhaust gas turbochargers are usually fastened to the bearing housing using a respective circlip. The use of such a circlip renders the mounting of the housing cover complicated, since the danger exists that a pressing force by means of which the housing cover is held on the bearing housing and which is exerted by the circlip on the housing cover is usually very imprecise and asymmetrical. This can result in the tilting and/or wedging of the housing cover, which can possibly cause leakage, particularly of lubricating oil, as well as blow-by of the exhaust gas turbocharger. This leads to an instability of the rotor during operation of the exhaust gas turbocharger. It was found that, in the extreme case, it is possible for the mounting of the housing cover to occur without any pressing at all in ordinary exhaust gas turbochargers, particularly if the circlip is not properly seated in its corresponding groove due to an assembly error. The danger of such faulty assembly occurring is high, particularly if no intensive and thus time-consuming and expensive monitoring of the process is performed.

In contrast, in the exhaust gas turbocharger according to the invention, the mounting of the housing cover can be achieved in an especially simple and thus time-saving and cost-efficient manner, since the housing cover itself and/or the threaded element can be fastened in an especially simple and thus time-saving and cost-efficient manner. Further, the danger of the threaded element and the housing cover tilting and becoming wedged and thus being faultily mounted can be kept especially low, so that time- and cost-intensive monitoring measures for monitoring the assembly can be avoided. Through the attachment of the housing cover by means of the exactly one threaded element, the housing cover can also be mounted in an especially precise manner. This should be understood as meaning that, using the threaded element, a force, particularly a pressing force, can be brought about by means through which the housing cover can be or is fastened to the bearing housing, with the pressing force acting in an at least substantially symmetrical manner. Excessive leakage and excessive blow-by can thus be prevented.

The abovementioned "blow-by" is to be understood as an undesired gas flow particularly between the bearing housing and the housing cover; such an undesired gas flow, which is a leakage flow, can occur particularly if the housing cover is asymmetrically mounted and thus tilted and/or wedged. The danger of such an asymmetrical mounting and of the tilting and/or wedging of the housing cover can be kept especially low with the exhaust gas turbocharger according to the invention, so that the danger of leakage and blow-by can also be kept low.

In the exhaust gas turbocharger according to the invention, the housing cover can be arranged on the side of a compressor wheel of the rotor and thus on the compressor side. In this way, leaks and blow-by can be prevented from causing an excessive amount of oil and/or lubricating oil for lubricating the rotor from getting into a compressor of the exhaust gas turbocharger and thus into the air that is to be compressed by the compressor. Furthermore, it is possible for the housing cover to be arranged on the side of a turbine wheel of the rotor and thus on the turbine side. In this way, an excessive amount of lubricating oil can be prevented from getting into a turbine of the exhaust gas turbocharger that can be driven by exhaust gas of the internal combustion engine.

In order to render the mounting of the housing cover especially simple while preventing excessive leakage and excessive blow-by, a provision is made in an advantageous embodiment of the invention, that the threaded element is integrally formed with the housing cover. In other words, the external thread and/or the threaded element is formed by the housing cover itself. This means that the external thread is integrated into the housing cover, so that the housing cover itself can be or is screwed to the bearing housing by means of the internal thread thereof. This enables especially precise and/or symmetrical or uniform fastening of the housing cover to the bearing housing to be achieved, so that tilting and/or wedging of the housing cover can be prevented.

Another embodiment is characterized in that the threaded element and the housing cover are embodied as components that are embodied separately from one another. This should be understood as meaning that the threaded element and the housing cover are not embodied as a single piece, for instance, but rather are inherently separate individual components. The threaded element, while holding the housing cover on the bearing housing in the axial direction, is supported at least indirectly on the housing cover. The threaded element is braced against the bearing housing in that, for example, it is screwed with the bearing housing by means of the external thread and the internal thread in the axial direction with intermediation of the housing cover, with the housing cover being arranged in the axial direction between the bearing housing and the threaded element. For example, on the one hand, the housing cover is supported in the axial direction at least indirectly on the bearing housing, and, on the other hand, it is supported in the axial direction at least indirectly on the threaded element, so that the housing cover is pressed by means of the threaded element in the axial direction against the bearing housing. This enables an especially uniform and/or symmetrical pressing force that acts on the housing cover to be achieved by means of the threaded element by means of which the housing cover is braced uniformly against the bearing housing. The danger of undesired leakage and undesired blow-by can be kept especially low in this way. At the same time, this enables the especially simple mounting of the housing cover and threaded element.

Another embodiment is characterized in that the housing cover is received at least partially in the threaded element. This is to be understood such that the housing cover is covered outward in the radial direction of the exhaust gas turbocharger at least in part by the threaded element. This, for one, enables the required installation space of the exhaust gas turbocharger, particularly in the axial direction, to be kept especially small. For another, especially good tightness can be achieved in this way, whereby the danger of undesired leakage and undesired blow-by can be kept especially low.

In an advantageous embodiment of the invention, the threaded element has a larger outside diameter than the housing cover, whereby the danger of tilting and/or wedging can be kept especially low. The threaded element is therefore not embodied as a screw that is inserted through a corresponding screw opening (in the form of a through hole, for example) of the housing cover; instead, the threaded element is embodied as an annular, particularly at least substantially annular, threaded cover by means of which a force, particularly pressing force, can be applied completely circumferentially to the housing cover over an especially large diameter thereof and particularly in the circumferential direction thereof while same housing cover is held on the bearing housing, and/or by means of which the housing cover is held on the bearing housing. The tilting and/or wedging of the housing cover during the mounting thereof can be prevented through this advantageous application of force.

In order to keep the danger of leakage and blow-by especially low, at least one impeller of the rotor is provided which is mounted on the bearing housing so as to rotate relative to the bearing housing about an axis of rotation. This impeller can be the previously mentioned turbine wheel or compressor wheel. The impeller has a wheel back that faces toward the bearing housing and has at least one flat wheel back region. The flat wheel back region is to be understood as referring to the fact that the wheel back region extends at least substantially perpendicular to the axial direction or to the axis of rotation and/or is arranged on a plane that extends at least substantially perpendicular to the axial direction and thus to the axis of rotation. The wheel back region is arranged so as to overlap at least partially with a region of the housing cover and/or of the threaded element that is arched in the axial direction away from the flat wheel back region. This means that the region of the housing cover that is arched in the axial direction away from the flat wheel back region is covered outwardly in the axial direction by the flat wheel back region of the wheel back of the impeller. This combination of the at least substantially flat wheel back region and the region of the housing cover that is concave in relation to the wheel back region creates an advantageous spacing between the wheel back or a wheel back geometry and the housing cover or the threaded cover whereby leakage, particularly oil leaks, as well as blow-by can be kept especially small.

In order to achieve an especially advantageous tightness of the exhaust gas turbocharger, a provision is made in another embodiment of the invention that the housing cover has at least one receptacle for a seal element for the purpose of sealing the housing cover against the bearing housing. The seal element is a ring, for example, particularly an O-ring, with the seal element preferably being made of rubber. The receptacle is a groove, for example, in which the seal element is received at least partially. The seal element is thus held in an especially secure manner on the housing cover, so that the housing cover can be sealed by means of the seal element especially well against the bearing housing.

In order to render assembly especially simple and to achieve an especially advantageous tightness of the exhaust gas turbocharger, a provision is made in another embodiment of the invention that the external thread of the threaded element is arranged on a larger outside diameter than the receptacle. In other words, the outer thread is arranged farther to the outside in the radial direction of the exhaust gas turbocharger than the receptacle.

Finally, it was found to be especially advantageous if at least one axial bearing is provided in order to support the rotor, with the axial bearing being held by means of the threaded element on the bearing housing. This enables the assembly of the exhaust gas turbocharger to be rendered especially simple, since the threaded element is used not only to hold the housing cover on the bearing housing, but rather also to hold, particularly fix, the axial bearing.

The invention also includes an internal combustion engine, particularly for a motor vehicle, with at least one exhaust gas turbocharger according to the invention. Advantageous embodiments of the exhaust gas turbocharger according to the invention are to be regarded as advantageous embodiments of the internal combustion engine according to the invention, and vice versa.

Additional advantages, features and details of the invention follow from the following description of preferred exemplary embodiments as well as from the drawings. The features and combinations of features cited above in the description as well as the features and combinations of features cited below in the description of the figures and/or in the figures alone can be used not only in the respectively indicated combination but also in any other combinations or alone without departing from the scope of the invention.

DETAILED DESCRIPTION OF THE DRAWINGS

In the figures, same or functionally analogous elements are designated by the same reference symbols.

Figure 1:
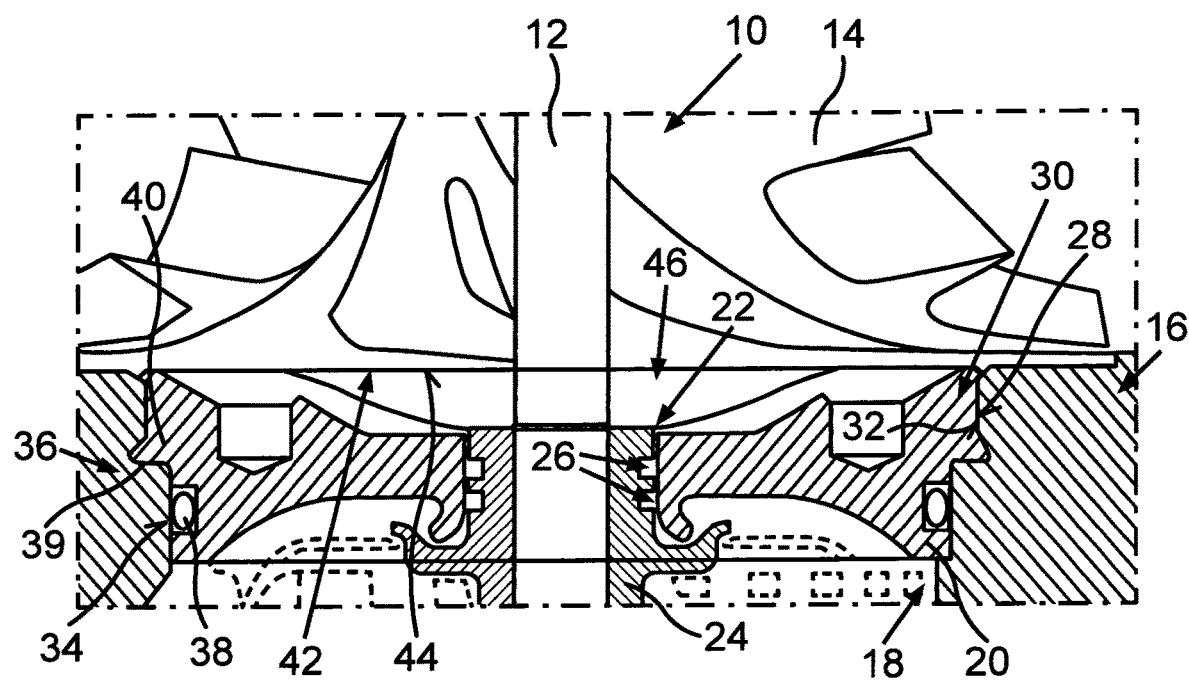
FIG. 1 shows a cut-out, schematic longitudinal section of an exhaust gas turbocharger according to a first embodiment for an internal combustion engine, with a housing cover being connected to a bearing housing by means of exactly one threaded element, which is integrally formed with the housing cover.

In a cut-out, schematic longitudinal section, FIG. 1 shows an exhaust gas turbocharger according to a first embodiment for an internal combustion engine, particularly of a motor vehicle such as a passenger vehicle, for example. The internal combustion engine is embodied as an internal combustion engine with reciprocating pistons and is used to drive the motor vehicle. The internal combustion engine has at least one intake tract through which air can be passed. During operation, the internal combustion engine sucks air from the environment via the intake tract, by means of which the air is fed to and into at least one combustion chamber, which is particularly embodied as a cylinder of the internal combustion engine. Air and fuel, particularly liquid fuel, are fed to the cylinder, which results in a fuel/air mixture in the cylinder (combustion chamber). The fuel/air mixture is ignited and thus combusts, thereby forming exhaust gas. The internal combustion engine further comprises an exhaust tract through which the exhaust gas is discharged from the cylinder.

The exhaust gas turbocharger comprises a turbine (not visible in FIG. 1) which comprises a turbine housing and a first impeller in the form of a turbine wheel. The turbine—that is, the turbine housing and the turbine wheel—is arranged in the exhaust tract, so that the turbine, more particularly the turbine wheel, can be driven by the exhaust gas.

The turbine wheel, more particularly the first impeller, is a component of a rotor of the exhaust gas turbocharger that is designated overall as 10. The rotor 10 comprises a shaft 12 to which the turbine wheel is fixed in a torque-proof manner. Furthermore, the rotor 10 comprises a second impeller in the form of a compressor wheel 14 of a compressor of the exhaust gas turbocharger. The compressor further comprises a compressor housing (not shown in FIG. 1) in which the compressor wheel 14 (second impeller) is arranged. The compressor wheel 14 is also connected in a torque-proof manner to the shaft 12, so that the compressor wheel 14 can also be driven by the turbine wheel via the shaft 12. The compressor—that is, the compressor housing and the compressor wheel 14—is arranged in the intake tract, so that the air flowing through the intake tract can be compressed by means of the compressor, particularly by means of the compressor wheel 14. For this purpose, the compressor wheel 14 is driven by the turbine wheel, so that energy contained in the exhaust gas can be utilized to compress the air. The turbine wheel and the compressor wheel 14 and thus the rotor 10 can be rotated collectively relative to the turbine housing and the compressor housing about an axis of rotation.

Furthermore, the exhaust gas turbocharger comprises a bearing housing 16 to which the compressor housing and the turbine housing are connected. The rotor 10 is mounted on the bearing housing 16 so as to be rotatable about the axis of rotation relative to the bearing housing 16. For example, the rotor 10 is rotatably mounted on the bearing housing 16 by means of a bearing assembly, with the rotor 10 being supported by means of the bearing assembly in the radial direction and on the bearing housing 16 in the axial direction.

It can be seen from FIG. 1 that the bearing housing 16 has a through hole 18 for the rotor 10 on the side of the compressor, more particularly of the compressor wheel 14, and thus on the compressor side. This means that—as can be seen from FIG. 1—the rotor 10 and, particularly, the shaft 12 penetrate through the through hole 18.

The exhaust gas turbocharger further comprises at least one compressor-side housing cover 20 that is connected to the bearing housing 16 by means of which the through hole 18 is covered at least partially in the axial direction of the exhaust gas turbocharger and, in the present case, is at least substantially sealed. The axial direction of the exhaust gas turbocharger coincides with the axial direction of the rotor 10, with the axial direction running parallel to the axis of rotation.

The embodiments above and below with the compressor-side through hole 18 and with the compressor-side housing cover 20 can be readily translated to the turbine side, so that the exhaust gas turbocharger, alternatively or additionally, has a through hole on the turbine side and a turbine-side housing cover corresponding thereto, for example.

The housing cover 20 itself also has a through hole 22 in which a sealing bush 24 is received at least partially. The sealing bush 24 penetrates through the through hole 22 at least partially and, in the present case, completely, with the sealing bush 24 being connected in a torque-proof manner to the shaft and arranged on the shaft 12, for example. On the outer circumferential side, the sealing bush 24 has receptacles in the form of grooves 26 in which respective seal elements, particularly in the form of radial shaft seal rings, can be received. The seal elements that can be received in the grooves 26 are each preferably made of rubber, so that the sealing bush 24 can be especially advantageously sealed by means of the seal elements against the housing cover 20. As a result, a gap that is formed particularly in the radial direction between the sealing bush 24 and the housing cover 20 can be sealed by means of the seal elements. In this way, excessive amounts of oil and/or lubricating oil as well as excessive amounts of blow-by can be prevented from getting into the compressor and thus into the air to be compressed by means of the compressor. The abovementioned lubricating oil is used particularly to lubricate the rotor 10, more particularly those bearing surfaces on which the rotor 10 is rotatably mounted on the bearing housing 16.

Blow-by is to be understood as a gas or a gas flow that can contain lubricating oil. Blow-by is an undesired leakage flow which, when not hindered, can undesirably flow between the sealing bush 24 and the housing cover 20 and/or between the housing cover 20 and the bearing housing 16 and thus into the compressor.

In order to enable the housing cover 20 to be mounted in an especially simple, precise, time- and cost-effective manner while simultaneously preventing excessive leakage and excessive blow-by, a provision is made in the exhaust gas turbocharger that the housing cover 20 is connected to the bearing housing 16 by means of exactly one threaded element 30 having an external thread 28 that is screwed to the bearing housing 16 by means of its external thread 28 and a corresponding internal thread 32 of the bearing housing 16. In other words, the housing cover 20 is not held on the bearing housing 16 by a plurality of screws or by means of a circlip, for example, but rather by means of the exactly one threaded element 30.

In the first embodiment, a provision is made that the threaded element 30 is integrally formed with the housing cover 20. This means that the threaded element 30 is formed by the housing cover 20 or, more particularly, that the external thread 28 is integrated into the housing cover 20, so that the housing cover 20 has the external thread 28, which, when the threaded element 30 or the housing cover 20 is screwed to the bearing housing 16, is screwed into the corresponding internal thread 32.

It can be seen from FIG. 1 that the housing cover 20 and the threaded element 30 are received in the axial direction at least partially, particularly at least substantially, and, in the present case, completely, in the corresponding through hole 18. If the external thread 28 is screwed into the corresponding internal thread 32, with the threaded element 30 and, with that, the housing cover 20 are rotated relative to the bearing housing 16 about the axis of rotation, then this rotation of the threaded element 30 and of the housing cover 20 is converted by the external thread 28 and the internal thread 32 into a translational movement of the threaded element 30 and of the housing cover 20 along the axis of rotation. As a result, the threaded element 30 and, particularly, the housing cover 20 are moved uniformly and symmetrically toward the bearing housing 16, so that the housing cover 20 can be supported and braced in the axial direction in an especially uniform and symmetrical manner against the bearing housing 16. In other words, it is possible to exert a pressing force that acts at least substantially symmetrically and uniformly on the housing cover 20, whereby the housing cover 20 is held against the bearing housing 16 particularly in the axial direction. A tilting and/or wedging of the housing cover 20 and an asymmetrical pressing force can be prevented, thus enabling the danger of leakage, particularly of lubricating oil, and blow-by to be kept especially low. Furthermore, assembly can be rendered especially simple, since the threaded element 30 is mounted together with the housing cover 20. Unlike when several screws are used to fasten the housing cover 20 to the bearing housing 16, in which case these screws—in order to avoid the danger of tilting and/or wedging—would need to be tightened simultaneously, the danger of a tilting and/or wedging of the housing cover 20 can be kept especially low while simultaneously enabling simple assembly, since only the exactly one threaded element 30 needs to be screwed or tightened.

It can also be seen from FIG. 1 that the housing cover 20, particularly the outer circumferential lateral surface 34 thereof, has at least one receptacle, here in the form of a groove 36, in which a seal element, embodied here as an O-ring 38, is received at least partially. The housing cover 20 is sealed off by means of the O-ring 38 against the bearing housing 16, so that the danger of leakage and blow-by can be kept especially low. In other words, in the first embodiment of the invention, a provision is made to integrate the external thread 28 and the groove 36 and thus the O-ring 38 into the housing cover 20, thus enabling not only an especially simple and time- and cost-effective assembly to be achieved, but rather also the number of parts and thus the weight of the exhaust gas turbocharger to be kept especially low. Furthermore, it can be seen especially clearly from FIG. 1 that the external thread 28 is arranged on a larger outside diameter than the groove 36. In other words, the external thread 28 is arranged farther to the outside in the radial direction than the groove 36.

The through hole 18 is embodied as a stepped opening and has a collar 39 that can act as a first stop. The threaded element 30 and the housing cover 20 are embodied on the outer circumferential side as a stepped ring and also have a collar 40, which acts as a second stop. The threaded element 30 and the housing cover 20 are screwed to the bearing housing 16 until the collar 40 is in supporting abutment with the collar 39. This supporting abutment enables the threaded element 30 and thus the housing cover 20 to be braced by means of the external thread 28 and the internal thread 32 against the bearing housing 16 and thus fastened or connected thereto. Furthermore, this enables an especially advantageous seal to be achieved, since the housing cover 20 can be supported over its outer circumferential lateral surface 34 outwardly in the radial direction on the bearing housing 16.

Figure 2:
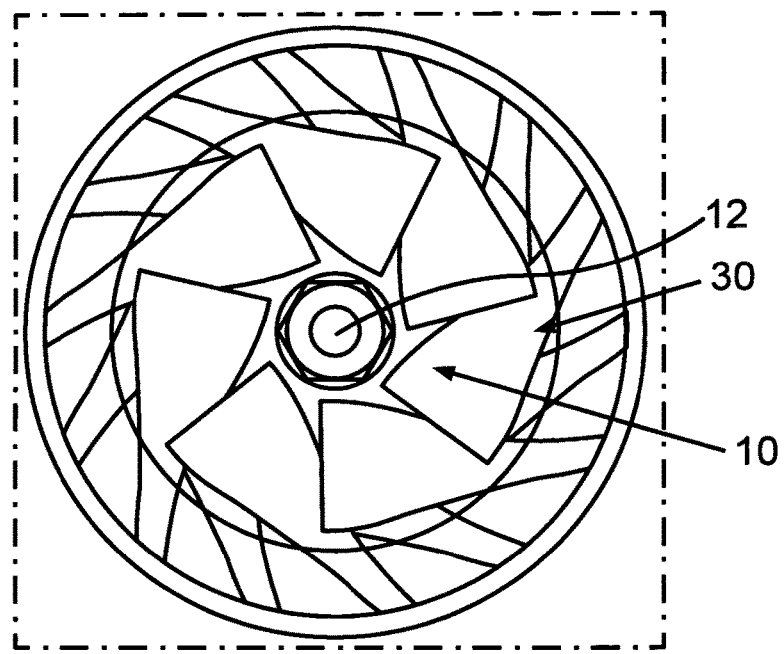
FIG. 2 shows a cut-out, schematic front view of the exhaust gas turbocharger according to the first embodiment.

It can also be seen from FIG. 1 that the compressor wheel 14 has a wheel back 42 that faces toward the bearing housing 16 and the threaded element 30, more particularly toward the housing cover 20. The wheel back 42 has at least one at least substantially flat wheel back region 44. In other words, the wheel back region 44 is arranged on a plane that extends at least substantially perpendicular to the axis of rotation or axial direction of the exhaust gas turbocharger. The wheel back region 44 is arranged so as to overlap at least partially with a region of the threaded element 30 or of the housing cover 20 that is designated by 46 in FIG. 1. This means that the region 46 outward in the axial direction is covered at least partially by the at least substantially flat wheel back region 44. The region 46 of the threaded element 30, more particularly of the housing cover 20 is arched away from the at least substantially flat wheel back region 44. In other words, the region 46 is concave in relation to the wheel back region 44. This enables an especially advantageous spacing extending in the axial direction between the compressor wheel 14, particularly the wheel back region 44, and the threaded element 30 or the housing cover 20, whereby undesired blow-by and undesired leakage, particularly of lubricating oil, can be kept at least low or prevented, since this spacing enables a flow between the compressor wheel 14 and the threaded element 30 or housing cover 20 to be optimized. FIG. 2 shows the exhaust gas turbocharger according to the first embodiment in a schematic front view.

Figure 3:
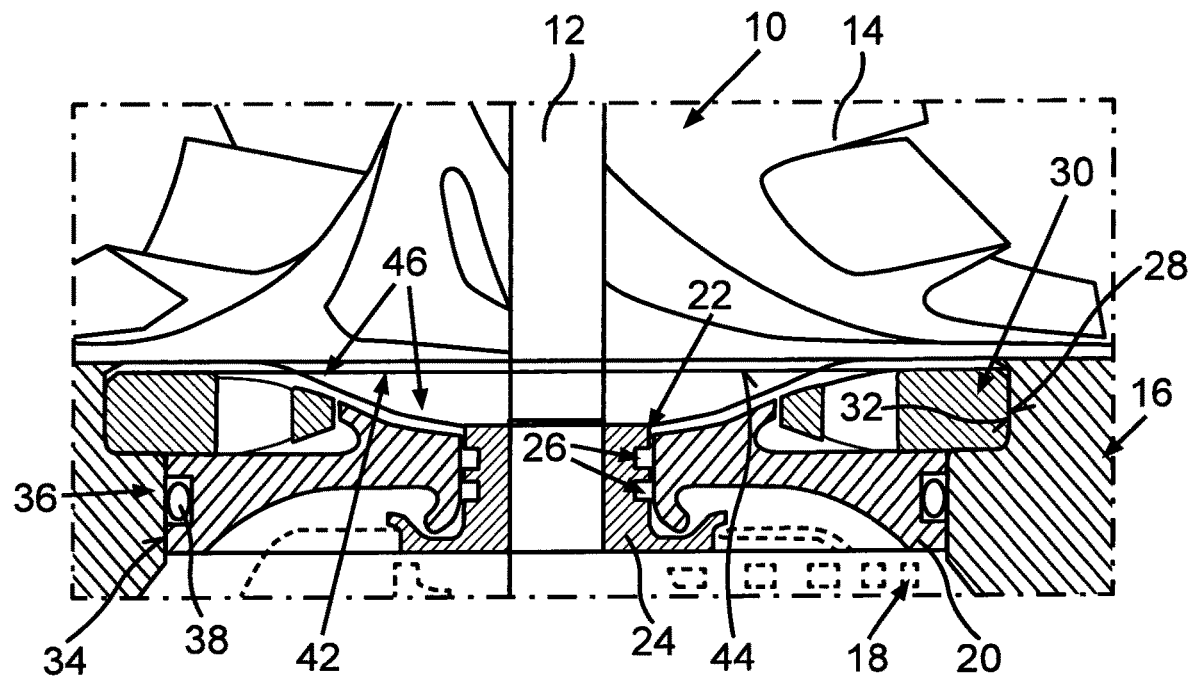
FIG. 3 shows a cut-out, schematic longitudinal section of the exhaust gas turbocharger according to a second embodiment in which the housing cover and the threaded element are embodied as separate individual components.
Figure 4:
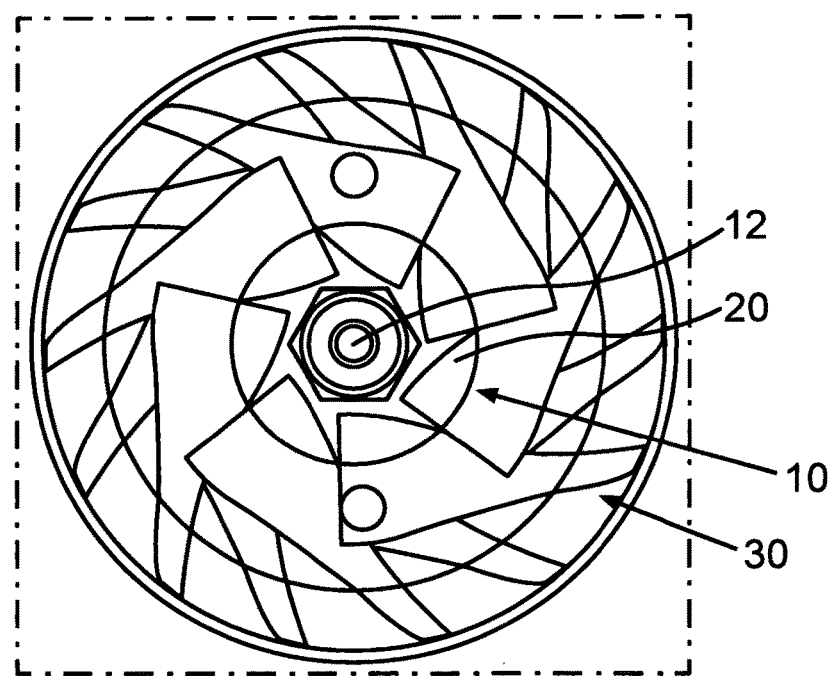
FIG. 4 shows a cut-out, schematic front view of the exhaust gas turbocharger according to the second embodiment.

FIGS. 3 and 4 show the exhaust gas turbocharger according to a second embodiment, with the exhaust gas turbocharger being shown in a cut-out, schematic longitudinal view in FIG. 3 and in a schematic front view in FIG. 4.

The second embodiment differs from the first embodiment particularly in that the housing cover 20 is not integrally formed with the threaded element 30, but rather the threaded element 30 and the housing cover 20 are separate from each other, that is, they are embodied as separate components that are supported at least indirectly and, in the present case, directly against one another. It can be seen from FIG. 3 that at least a portion of the housing cover 20 is arranged in the axial direction between the threaded element 30 and the bearing housing 16, so that, when the threaded element 30 is screwed to or into the bearing housing 16, the housing cover 20 is braced in the axial direction against the bearing housing 16. To wit, the housing cover 20 is supported in the axial direction at least indirectly and, in the present case, directly on the bearing housing 16 on the one hand, and the housing cover 20 is supported in the axial direction at least indirectly and, in the present case, directly on the threaded element 30 on the other hand. The housing cover 20 is thus pressed in the axial direction against the bearing housing 16 when the threaded element 30 is screwed to the bearing housing 16 and tightened.

It can also be seen from FIG. 3 that the housing cover 20 is received at least partially in the threaded element 30, so that at least a portion of the housing cover 20 is covered by the threaded element 30 in the radial direction. It can also be seen from FIG. 3 that both the threaded element 30 and the housing cover 20 have respective regions 46 that are respectively covered at least partially outwardly in the axial direction by the at least substantially flat wheel back region 44. Like the region 46 in the first embodiment, the regions 46 are concave in relation to the at least substantially flat wheel back region 44—that is, they are arched away from the at least substantially flat wheel back region 44, thus creating the advantageous spacing described in conjunction with the first embodiment between the wheel back 42, more particularly the geometry thereof, and the threaded element 30 or housing cover 20.

In the second embodiment, the threaded element 30 is thus embodied as a threaded cover that is screwed to the bearing housing 16 by means of the external thread 28 and the corresponding internal thread 32. The housing cover 20 is held on the bearing housing 16 by means of this threaded cover. The use of such a threaded cover that is embodied separately from the housing cover 20 enables not only especially simple assembly, but also the implementation of a principle of identical parts, so that the identical or very same threaded cover can be used for different sizes of the housing cover 20, that is, for different-sized housing covers, in order to fasten, by means of the same threaded cover, the different or different-sized housing covers to a respective bearing housing of an exhaust gas turbocharger.

LIST OF REFERENCE SYMBOLS 10 rotor
12 shaft
14 compressor wheel
16 bearing housing
18 through hole
20 housing cover
22 through hole
24 sealing bush
26 groove
28 external thread
30 threaded element
32 internal thread
34 outer circumferential lateral surface
36 groove
38 O-ring
39 collar
40 collar
42 wheel back
44 wheel back region
46 region

The invention claimed is:

1. An exhaust gas turbocharger for an internal combustion engine, comprising:
a rotor;
a bearing housing having a through hole for the rotor;
a housing cover; and
a threaded cover;
wherein the threaded cover has a larger outside diameter than the housing cover and wherein the threaded cover is embodied as an annular threaded cover;
wherein the bearing housing, the housing cover and the threaded cover are separate components, wherein the housing cover is not integrally formed with the threaded cover and wherein at least a portion of the housing cover is disposed in an axial direction between the threaded cover and the bearing housing;
wherein the threaded cover is screwed to the bearing housing via an external thread of the threaded cover and an internal thread of the bearing housing and the housing cover is pressed in the axial direction against the bearing housing when the threaded cover is screwed to the bearing housing.

2. The exhaust gas turbocharger according to claim 1, wherein the housing cover is received at least partially in the threaded cover.

3. The exhaust gas turbocharger according to claim 1, wherein an impeller of the rotor is mounted on the bearing housing so as to rotate relative to the bearing housing about an axis of rotation, wherein the impeller has a wheel back that faces toward the bearing housing and has a flat wheel back region that is disposed so as to overlap at least partially with a region of the housing cover and/or a region of the threaded cover, and wherein the region of the housing cover and the region of the threaded cover are arched in the axial direction away from the flat wheel back region.

4. The exhaust gas turbocharger according to claim 1, wherein the housing cover has a receptacle for a seal element for sealing the housing cover against the bearing housing.

5. The exhaust gas turbocharger according to claim 1, further comprising an axial bearing, wherein the rotor is supported by the axial bearing and wherein the axial bearing is held by the threaded cover on the bearing housing.

6. An internal combustion engine, comprising an exhaust gas turbocharger according to claim 1.

* * * * *